United States Patent [19]

Nilssen

[11] Patent Number: 4,506,318
[45] Date of Patent: Mar. 19, 1985

[54] INVERTER WITH CONTROLLABLE RMS OUTPUT VOLTAGE MAGNITUDE

[76] Inventor: Ole K. Nilssen, Caesar Dr., Rte. 5, Barrington, Ill. 60010

[21] Appl. No.: 487,817

[22] Filed: Apr. 22, 1983

[51] Int. Cl.$^3$ .............................................. H02M 7/44
[52] U.S. Cl. .................................... 363/132; 363/98
[58] Field of Search ................... 363/17, 22, 23, 34, 363/37, 38, 131, 132, 157, 159, 163, 164, 165, 98

[56] References Cited

U.S. PATENT DOCUMENTS

| | | | |
|---|---|---|---|
| 2,968,738 | 1/1961 | Pintell | 363/23 X |
| 3,267,349 | 8/1966 | Krause | 363/22 X |
| 4,017,785 | 4/1977 | Perper | 363/37 |

FOREIGN PATENT DOCUMENTS 2712941  9/1978  Fed. Rep. of Germany ........ 363/34

Primary Examiner—Peter S. Wong
Assistant Examiner—Judson H. Jones

[57] ABSTRACT

An inverter is adapted to be powered from full-wave-rectified unfiltered 60 Hz power line voltage and to provide an amplitude-modulated output of relatively high-frequency voltage. The inverter has to be triggered into oscillation. However, once triggered, it will continue to oscillate—but only for as long as its DC supply voltage is present.

Since the DC supply voltage falls to zero magnitude once for each half-cycle of the 60 Hz power line voltage, the inverter stops oscillating after each such half-cycle; and therefore, for as long as output voltage is desired, the inverter has to be re-triggered after each half-cycle.

Triggering is accomplished by a Diac in combination with an RC integrating circuit; which means that the inverter is triggered into oscillation some time period after the onset of each half-cycle. The length of this time period is determined by the nature of the RC integrating circuit, in the same way as phase-control is accomplished in an ordinary Triac-type incandescent lamp dimmer.

By varying the time-constant of the RC integrating circuit, the inverter can be triggered into oscillation with varying amounts of delay; which means that the net effective RMS magnitude of the output voltage can be adjusted by adjusting the time-constant of the RC integrating circuit.

8 Claims, 3 Drawing Figures

INVERTER WITH CONTROLLABLE RMS OUTPUT VOLTAGE MAGNITUDE

BACKGROUND OF THE INVENTION

1. Field of the Invention

The present invention relates to power-line-operated inverter-type power supplies with means for controllably adjusting the RMS magnitude of the inverter output voltage.

2. Description of Prior Art

Power-line-operated inverter-type power supplies are presently being used in a variety of applications. In particular, such power supplies are frequently being used for powering low-voltage incandescent lamps or similar loads.

When using such inverter-type power supplies in connection with powering low-voltage incandescent lamps, it is sometimes desirable to be able controllably to adjust the RMS magnitude of the output voltage, thereby providing for adjustment of the amount of light provided by the lamps. However, to provide cost-effectively for means to effect controllable adjustment of the RMS magnitude of the output of such power supplies is not as simple as it might initially appear.

Of course, to achieve such adjustment control, one might use a variable-ratio transformer (Variac) between the power line and the input of the power supply. However, the cost and complexities associated with such an approach is unacceptably high in most applications.

Or, one might consider the use of a Triac-type voltage control means mounted between the power line and the power supply. However, Triac-type voltage control means simply do not function properly with the kind of input characteristics normally associated with power-line-operated inverter-type power supplies.

Then there is the possibility of using an inverter-type power supply with a special input circuit that would permit the use of a Triac-type control means; which input circuit would then have to make the inverter power-input-characteristics appear substantially like a resistive load. Even so, however, there is the cost of the Triac-type control to consider.

The present invention represents yet another solution; which other solution is novel and substantially more cost-effective than that of using a Triac-type control means between the power line and the inverter input.

SUMMARY OF THE INVENTION

Objects of the Invention

An object of the present invention is that of providing a power-line-operated inverter-type power supply with cost-effective means to permit controllable adjustment of the RMS magnitude of its output voltage.

This as well as other objects, features and advantages of the present invention will become apparent from the following description and claims.

Brief Description

In its preferred embodiment, subject invention is a power supply adapted to be powered from the regular 60 Hz power line voltage and to provide an output of relatively high-frequency (30 kHz) substantially squarewave voltage. This output voltage is provided by an inverter that is powered by way of a pulsed DC supply voltage derived from unfiltered rectification of the power line voltage. Thus, the high-frequency inverter output voltage is pulse-amplitude-modulated in correspondence with the pulse-amplitude-modulations of the pulsed DC supply voltage.

The inverter is of a type that has to be triggered into oscillation. However, once triggered, it will continue to oscillate by itself—but only for as long as its DC supply voltage is above a certain minimal magnitude.

Since the pulsed DC supply voltage falls to zero magnitude between each pulse, the inverter stops oscillating between each pulse. Thus, as long as output voltage is desired, the inverter has to be triggered after each pulse of the DC supply voltage.

Inverter triggering is accomplished by a Diac in combination with an RC integrating circuit; which means that—upon each application of a pulse of DC supply voltage—the inverter is triggered into oscillation only after the DC supply voltage has been present for some period of time; the length of this period being determined by the nature of the RC integrating circuit, much in the same way as phase-control is accomplished in an ordinary Triac-type incandescent lamp dimmer.

By varying the time-constant of the RC integrating circuit, the inverter can be made to be triggered into oscillation with varying amounts of delay; which means that the net effective RMS magnitude of the output voltage can be adjusted by adjusting the time-constant of the RC integrating circuit.

Thus, the RMS magnitude of the output of the power supply can be controlled much in the same fashion as can the RMS output voltage of an ordinary Triac-type voltage control means.

More particularly, in its preferred embodiment, this power-line-operated inverter-type power supply comprises the following key elements:

(a) A full-wave rectifier means connected in circuit with a regular 120-Volt/60-Hz power line and adapted to provide an unfiltered DC supply voltage, said DC supply voltage being unidirectional and having an instantaneous magnitude that is substantially equal to the absolute value of the instantaneous magnitude of the sinusoidal voltage on the power line;

(b) A self-oscillating inverter connected with and powered by said DC supply voltage, said inverter being of a type that needs to be triggered into oscillation, but which ceases to oscillate once the instantaneous magnitude of said DC supply voltage falls below a certain minimal level, said inverter being operative to convert said DC supply voltage into a substantially squarewave output voltage of about 30 kHz frequency, the absolute value of the instantaneous magnitude of said squarewave output voltage being substantially proportional to the instantaneous magnitude of said DC supply voltage;

(c) Means for triggering said inverter into oscillation some time-period after the instantaneous magnitude of the DC supply voltage exceeds a certain threshold level, the length of said time-period being on the order of a fraction of the half-period of said power line voltage, the magnitude associated with said minimal level being smaller than the magnitude associated with said threshold level;

(d) Load means connected with and powered by said squarewave output voltage; and (e) Means for controllably adjusting the length of said time period; whereby:

the squarewave voltage provided to said load means has an instantaneous absolute magnitude that is substantially proportional to the instantaneous absolute magnitude of the voltage on the power line, except for an adjustable time-interval between each half-cycle of the power line voltage, during which adjustable time-interval the magnitude of said squarewave voltage is substantially zero, the length of said adjustable time-interval being somewhat larger than that of said time period;

thereby permitting controllable adjustment of the effective RMS magnitude of the squarewave output voltage, the integrating period for establishing said effective RMS magnitude being equal to or longer than said half-period.

DESCRIPTION OF THE PREFERRED EMBODIMENT

Description of the Drawings

Figure 1:
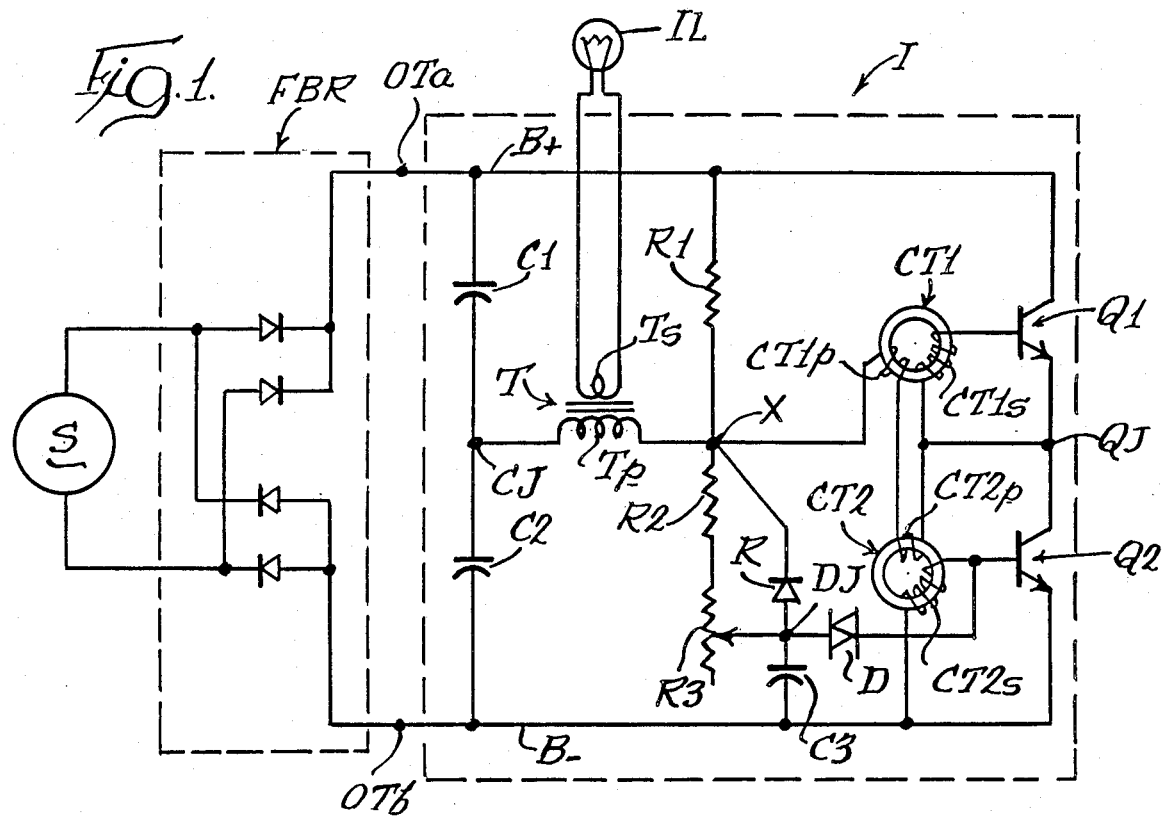
FIG. 1 schematically illustrates the preferred embodiment of the invention, showing an inverter-type power supply adapted to power a low-voltage incandescent lamp.

In FIG. 1, a source S of 120 Volt/60 Hz voltage is connected with full-bridge rectifier means FBR. Positive output terminal OTa of rectifier means FBR is connected directly with a B+ bus; and negative output terminal OTb of rectifier means FBR is connected directly with a B− bus.

Between the B+ bus and the B− bus is connected a series-combination of two capacitors C1 and C2, which two capacitors are connected together at a junction CJ.

Between the B+ bus and the B− bust is also connected a series-combination of two transistors Q1 and Q2.

The secondary winding CT1s of positive feedback current transformer CT1 is connected directly between the base and the emitter of transistor Q1; and the secondary winding CT2s of positive feedback current transformer CT2 is connected directly between the base and the emitter of transistor Q2.

The collector of transistor Q1 is connected directly with the B+ bus; the emitter of transistor Q2 is connected directly with the B− bus; and the emitter of transistor Q1 is connected directly with the collector of transistor Q2, thereby forming junction QJ.

The series-connected primary windings CT1p and CT2p are connected directly between junction QJ and a point X; while the primary winding Tp of transformer T is connected between point X and junction CJ.

Transformer T has a secondary winding Ts, which is connected directly with an incandescent lamp IL.

A resistor R1 is connected with its one terminal to the B+ bus and with its other terminal to point X. Another resistor R2 is connected between point X and one terminal of a variable resistor R3. The other terminal of R3 is connected to junction DJ, to which junction is also connected one of the terminals of a capacitor C3. The other terminal of C3 is connected to the B− bus.

A Diac D is connected between junction DJ and the base of transistor Q2.

A rectifier R is connected with its anode to junction DJ and with its cathode to junction QJ.

The overall inverter is identified with the letter I.

Actual values and descriptions of the critical components of the preferred arrangement in FIG. 1 are listed as follows.

| | |
|---|---|
| Output of Source S: | 120 Volt/60 Hz; |
| Full Bridge Rectifier FBR: | Four 1N4004's; |
| Capacitors C1 & C2: | 0.47 μF/200 Volt; |
| Transistors Q1 & Q2: | Motorola MJE13002's; |
| Resistor R1: | 33 kOhm/0.25 Watt; |
| Resistor R2: | 100 kOhm/0.25 Watt; |
| Adjustable Resistor R3: | 1.5 MegOhm Potentiometer; |
| Capacitor C3: | 22 nF/50 Volt; |
| Rectifier R: | 1N4004; |
| Diac D: | General Electric ST-2; |
| Transformers CT1 & CT2: | Wound on Ferroxcube Toroids 213T050 of 3E2A Ferrite Material with two turns of #27 wire for the primary windings and ten turns of #31 wire for the secondary windings; |
| Transformer T: | Wound on a Ferroxcube 2616 Pot Core of 3C8 Ferrite Material with 95 turns of #27 wire for the primary winding and 20 turns of five twisted strands of #27 wire for the secondary winding; |
| Incandescent Lamp IL: | 12 Volt/25 Watt. |

The frequency of inverter oscillation associated with the component values identified above is approximately 30 kHz.

In FIG. 2a, the waveform identified as Wa represents the voltage Vi present between the B− bus and the B+ bus as plotted against time t. The magnitude of voltage Vi at the time t1 when the inverter is triggered into oscillation is indicated as Vi1. The magnitude of voltage Vi at the time t2 the inverter drops out of oscillation is indicated as Vi2.

In FIG. 2b, the waveform identified as Wb represents the inverter output voltage Vo plotted against time t; which output voltage exists across the secondary winding Ts of transformer T in FIG. 1, and which is the voltage provided to incandescent lamp IL.

Description of Operation

The operation of the circuit arrangement of FIG. 1 is described as follows.

Source S represents an ordinary 12 Volt/60 Hz electric utility power line, the voltage from which is rectified in full-wave fashion by full-bridge rectifier means FBR. Thus, in the absence of filtering means, the voltage present across output terminals OTa and OTb is substantially as depicted in FIG. 2a; which voltage is applied directly to the inverter circuit I.

This inverter circuit, which consists of the two series-connected switching transistors Q1 and Q2 in combination with the two positive feedback transformers CT1 and CT2, represents a self-oscillating half-bridge inverter and operates in a manner that is analogous with circuits previously described in published literature, as for instance in U.S. Pat. No. 4,184,128 entitled High Efficiency Push-Pull Inverters.

Since the DC voltage-supply feeding the inverter has no filtering capacitors, it is necessary to provide within the inverter a low impedance return path for the inverter current. Such a low impedance return path is provided by way of the two series-connected capacitors C1 and C2. However, it is necessary that the capacitance values of these capacitors be kept small enough not to represent significant energy-storing capacity in comparison to the amount of energy being drawn by the inverter over a half-cycle of the power line voltage. In this case, with the power drawn being about 25 Watt (which is about 208 milli-Joule per half-cycle of the 60 Hz power line voltage) the energy stored by the two series-connected 0.47 uF capacitors is indeed small in comparison (being only 2.6 milli-Joule at 150 Volt).

In the inverter circuit of FIG. 1, the bases of the transistors are—in terms of DC—shorted to their emitters; which implies that the inverter can not start oscillating by itself. However, by providing but a single brief pulse to the base of transistor Q2, this transistor is caused to conduct momentarily; which momentary conduction puts this one transistor into an amplifying situation; which is enough to trigger the inverter into oscillation—provided, of course, that there is adequate voltage present between the B— bus and the B+ bus.

Once triggered into oscillation, the inverter will continue to oscillate until the voltage between the B— bus and the B+ bus falls to such a low level as to be inadequate for sustaining regenerative feedback. At this point, which is identified as Vi2 in FIG. 2a, oscillations cease.

Inverter triggering is accomplished by way of a Diac; which Diac itself is triggered by the voltage on capacitor C3.

The output of the half-bridge inverter circuit is a substantially squarewave 30 kHz AC voltage, which output is provided between point X and junction CJ, and across which output is connected the primary winding of transformer T. The peak-to-peak amplitude of this squarewave voltage is equal to the magnitude of the DC voltage present between the B— bus and the B+ bus; and therefore, as the magnitude of this DC voltage varies, so does the amplitude of the squarewave output voltage.

The incandescent lamp IL is connected directly across the secondary winding Ts of transformer T; which means that the voltage presented to the incandescent lamp is directly proportional to the inverter circuit output voltage.

Being supplied with a pulsed DC voltage similar to that depicted in FIG. 2a, the inverter circuit—even if oscillating at some given moment—will cease oscillating when the DC supply voltage falls below a certain minimal level (Vi2 in FIG. 2a). Thus, if the inverter is triggered into oscillation at some time during each of the unidirectional sinusoidally-shaped voltage pulses constituting the DC supply voltage, it will cease to oscillate at or near the end of each of these pulses.

Thus, the inverter circuit of FIG. 1 behaves much like a Triac: it can be triggered ON, and will remain ON until the end of the power-cycle: until current flowing to the load falls below a certain minimal level. And, like a Triac, it can be triggered at substantially any point within the power-cycle; which means that it can be phase-controlled just like a Triac.

Figure 2:
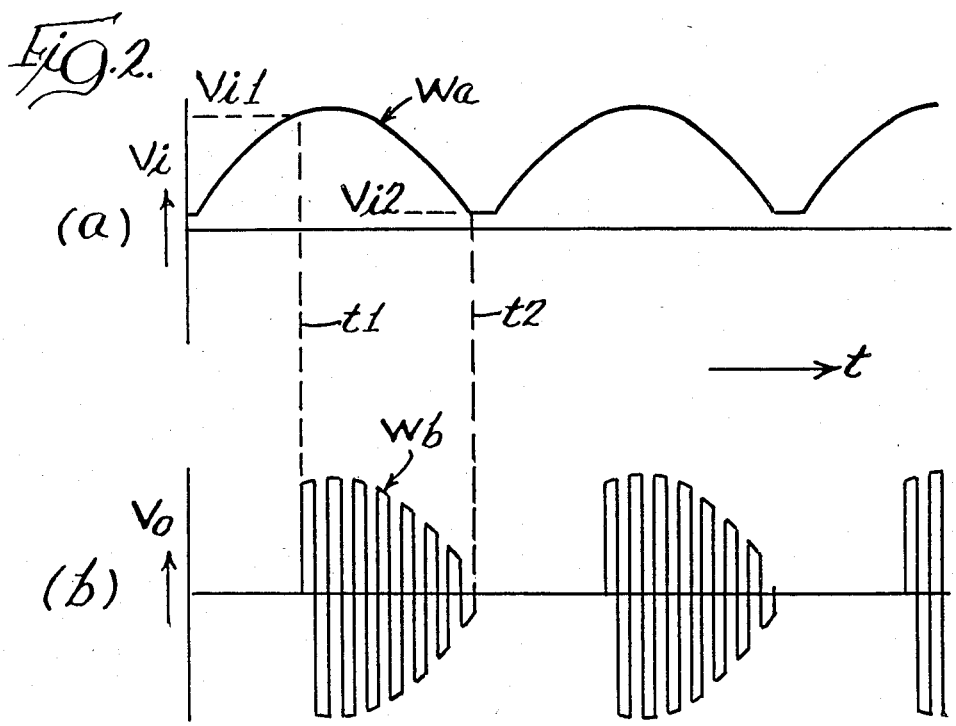
FIG. 2a illustrates the waveform of the DC supply voltage applied to the inverter.
FIG. 2b illustrates the overall waveform of the inverter's amplitude-modulated squarewave output voltage.

In other words, the RMS power provided to the incandescent lamp can be controlled over a wide range simply by controlling the timing of the inverter trigger point (t1 in FIG. 2).

Triggering of the inverter circuit is accomplished essentially the same way as is triggering of a Triac, and phase control is accomplished in the same manner.

In FIG. 1, resistor R2 and R3 in combination constitutes a resistance means through which capacitor C3 is charged. By adjusting the magnitude of the combined resistance, the time to charge capacitor C3 is similarly adjusted; which implies that the phase-point at which the inverter is triggered into oscillation is correspondingly adjusted.

The purpose of rectifier R is that of making sure that capacitor C3 gets fully discharged after the inverter is triggered into oscillation; which implies that this capacitor will start each new power cycle in a fully discharged condition, thereby assuring time-consistent triggering.

The reason for having R2 as a resistor physically separate from R3 is that of preventing the voltage at point X from being applied directly to capacitor C3, which could provide for a situation of actually preventing triggering from taking place.

The purpose of resistor R1, the resistance value of which is quite small in comparison with that of R2 and R3 combined, is that of making sure that there is enough voltage at junction CJ (relative to the B— bus) to permit the inverter circuit to be triggered into oscillation.

Otherwise, the following comments are offered.

(a) The concept of feeding an inverter with a pulsed DC voltage and to have its oscillations phase controlled (in relationship to the phasing of the DC pulses) is not limited to be used with a half-bridge inverter circuit. Most any type of self-oscillating inverter circuit may be used, the chief criterion being that the inverter circuit must be of such a nature as to have to be triggered into oscillation.

(b) To achieve a reasonably wide range of control of RMS output voltage, it is important that the inverter be capable of sustained self-oscillation even at relatively low levels of DC supply voltage. In the circuit of FIG. 1, stable inverter self-oscillation is sustained down to a DC supply voltage of about 20 Volt; below which voltage oscillations abruptly cease.

(c) By making the combined resistance of R2 and R3 large enough, it is readily possible to arrange for the inverter not to be triggered into oscillation at all during the duration of a given pulse of the DC supply voltage. However, it is important to recognize that—if the time-constant associated with C3 and the combined resistance of R2 and R3 is too large to permit triggering within a given pulse of the DC supply voltage—triggering may never-the-less take place at a later time, such as during the following pulse. Such delayed triggering is generally undesirable, but can be avoided simply by preventing R3 from reaching a resistance level high enough to cause it.

(d) By providing for means by which the inverter trigger circuit can be activated and/or de-activated (such as with a switch means connected between R2 and R3, and perhaps actuated by the same means as is used for adjusting the magnitude of R3), inverter ON-OFF control can be had in addition to phase-control.

It is believed that the present invention and its several attendant advantages and features will be understood from the preceeding description. However, without departing from the spirit of the invention, changes may be made in its form and in the construction and interrelationships of its component parts, the form herein presented merely representing the preferred embodiment.

I claim:

1. A power supply adapted to be powered from the relatively low frequency voltage on a regular electric utility power line and to provide a relatively high frequency output voltage, comprising:

rectifier means connected with said power line and operative to provide a DC supply voltage, said DC supply voltage being characterized by having an instantaneous undirectional magnitude that is substantially equal to the instantaneous absolute magnitude of said low frequency voltage, whereby said instantaneous unidirectional magnitude increases above a certain threshold level once for each half-cycle of said relatively low frequency voltage and decreases below said certain threshold level once for each half-cycle of said relatively low frequency voltage;

inverter connected with said DC supply voltage and operative to provide said relatively high frequency output voltage, said inverter characterized by: (i) ceasing operation each time the instantaneous magnitude of said DC supply voltage decreases below said certain threshold level, (ii) resuming operation each time after the magnitude of said DC supply voltage has increased above said certain threshold level, but only if it is provided with a trigger signal; and trigger means connected in circuit with said DC supply voltage and operable to provide said trigger signal to said inverter some pre-selected time-period after each time the magnitude of said DC supply voltage has increased above said certain threshold level, the duration of said pre-selected time-period being less than that of the half-period of said relatively low frequency voltage, whereby said inverter starts and stops operation once during each half-cycle of said relatively low frequency voltage, thereby correspondingly providing said output voltage for only a pre-selected fraction of the duration of each half-cycle of said relatively low frequency voltage.

2. The power supply of claim 1 combined with an adjustment means for adjusting the duration of said pre-selected time-period, resulting in a corresponding adjustment of said pre-selected fraction, thereby permitting the adjustment of the RMS magnitude of said output voltage.

3. The power supply of claim 2 wherein said adjustment means includes an adjustable resistance means.

4. A power supply adapted to be powered from the relatively low frequency line voltage on a regular electric power line and operative to provide a relatively high frequency output voltage, comprising:

rectifier means connected with said power line and operative to provide a non-filtered DC supply voltage;

inverter connected with said DC supply voltage and operative when oscillating to provide said output voltage, said inverter characterized by: (i) ceasing oscillation whenever the magnitude of said DC supply voltage decreases below a certain minimum level, and (ii) resuming oscillation only after the magnitude of said DC supply voltage has increased above said certain minimum level, but then only after having received a trigger pulse; and trigger means connected in circuit with said inverter and operative to provide said trigger pulse a pre-selected brief time-period after the magnitude of said DC supply voltage has increased above said certain minimum level, said time-period being shorter than the period of said line voltage;

whereby said output voltage is periodically intermittent with a periodicity equal to that of said line voltage.

5. The power supply of claim 4 and adjustment means by which the duration of said pre-selected brief time-period may be adjusted, thereby permitting adjustment of the RMS magnitude of said output voltage.

6. The power supply of claim 4 and means for preventing a trigger pulse from being provided during any period when the inverter is oscillating.

7. A power supply adapted to be powered from the relatively low frequency line voltage on an ordinary electric power line and to provide a relatively high frequency output voltage, said power supply comprising:

rectifier means connected with said power line and operative to provide a non-filtered DC voltage, the magnitude of said DC voltage falling below and increasing above a certain threshold level at least once during each cycle of said line voltage;

inverter connected with said DC voltage and operative, when oscillating, to provide said output voltage, said inverter characterized by: (i) ceasing oscillation whenever the magnitude of said DC voltage falls below said threshold level, (ii) resuming its oscillation whenever the magnitude of said DC voltage has increased above said threshold level, but then only if provided with a trigger signal; and trigger means for providing said trigger signal some pre-selected time-period after each time the magnitude of said DC voltage has increased above said threshold level;

whereby said output voltage is provided during only a fraction of the period of said line voltage.

8. The power supply of claim 7 wherein means have been provided for adjustment of the duration of said pre-selected time-period, thereby permitting adjustment of the RMS magnitude of said output voltage.

* * * * *

(12) EX PARTE REEXAMINATION CERTIFICATE (6001st)
United States Patent
Nilssen

(10) Number: US 4,506,318 C1
(45) Certificate Issued: Nov. 13, 2007

(54) INVERTER WITH CONTROLLABLE RMS OUTPUT VOLTAGE MAGNITUDE

(76) Inventor: Ole K. Nilssen, Caesar Dr., Rte. 5, Barrington, IL (US) 60010

Reexamination Request:
No. 90/007,699, Aug. 31, 2005

Reexamination Certificate for:
Patent No.: 4,506,318
Issued: Mar. 19, 1985
Appl. No.: 06/487,817
Filed: Apr. 22, 1983

(51) Int. Cl.
*H02M 7/44* (2006.01)
*H02M 7/5387* (2006.01)

(52) U.S. Cl. .................... 363/132; 363/98; 315/194; 315/224; 315/291

(58) Field of Classification Search ................ 315/194
See application file for complete search history.

(56) References Cited

U.S. PATENT DOCUMENTS

| | | | |
|---|---|---|---|
| 4,104,715 A | | 8/1978 | Lawson |
| 4,164,014 A | | 8/1979 | Crowe et al. |
| 4,233,545 A | * | 11/1980 | Webster et al. ....... 250/214 AL |
| 4,414,617 A | | 11/1983 | Galindo |
| 4,502,107 A | | 2/1985 | Nilssen |
| 4,506,318 A | | 3/1985 | Nilssen |
| 4,591,764 A | | 5/1986 | Nilssen |
| 5,083,255 A | | 1/1992 | Nilssen |

OTHER PUBLICATIONS

General Electric Controlled Rectifier Manual, First Ed. (1960), Chap. 7, pp. 82–105; Chap. 8, 106–143.
Motorola Application Note AN–199, "A Solid–State 15KHz Power Inverter," Jack Takesuye (1967).
Motorola Application Note AN–222, "The ABC's of DC to AC Inverters," rev. by Robert J. Havor (1972).
Motorola Semiconductor Power Circuits Handbook, First Edition (1968), Chap 1 pp. 1–18—1–23 and Chap. 2 pp. 2–1—2–65.

* cited by examiner

*Primary Examiner*—Ovidio Escalante

(57) ABSTRACT

An inverter is adapted to be powered from full-wave-rectified unfiltered 60 Hz power line voltage and to provide an amplitude-modified output of relatively high-frequency voltage. The inverter has to be triggered into oscillation. However, once triggered, it will continue to oscillate—but only for as long as its DC supply voltage is present.

Since the DC supply voltage falls to zero magnitude once for each half-cycle of the 60 Hz power line voltage, the inverter stops oscillating after each such half-cycle; and therefore, for as long as output voltage is desired, the inverter has to be re-triggered after each half-cycle.

Triggering is accomplished by a Diac in combination with an RC integrating circuit; which means that the inverter is triggered into oscillation some time period after the onset of each half-cycle. The length of this time period is determined by the nature of the RC integrating circuit, in the same way as phase-control is accomplished in an ordinary Triac-type incandescent lamp dimmer.

By varying the time-constant of the RC integrating circuit, the inverter can be triggered into oscillation with varying amounts of delay; which means that the net effective RMS magnitude of the output voltage can be adjusted by adjusting the time-constant of the RC integrating circuit.

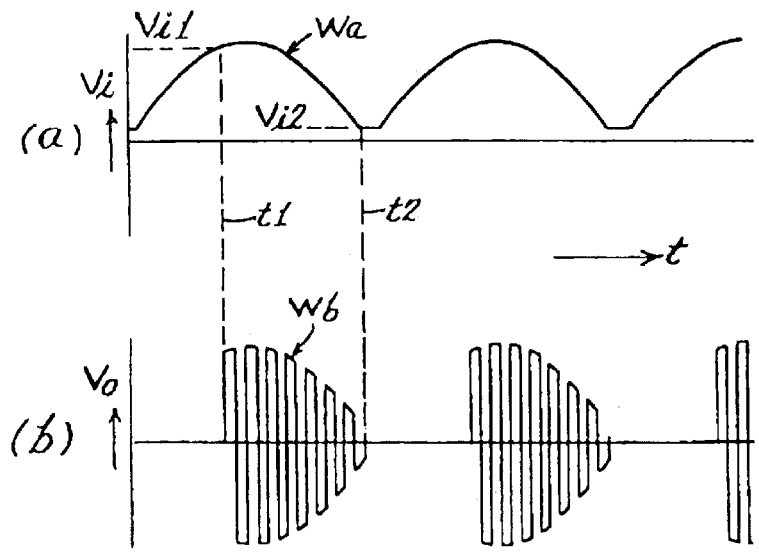

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *